No. 617,873. Patented Jan. 17, 1899.
J. A. BIRCHLER.
DRIVING MECHANISM FOR BICYCLES.
(Application filed Apr. 15, 1898.)
(No Model.)
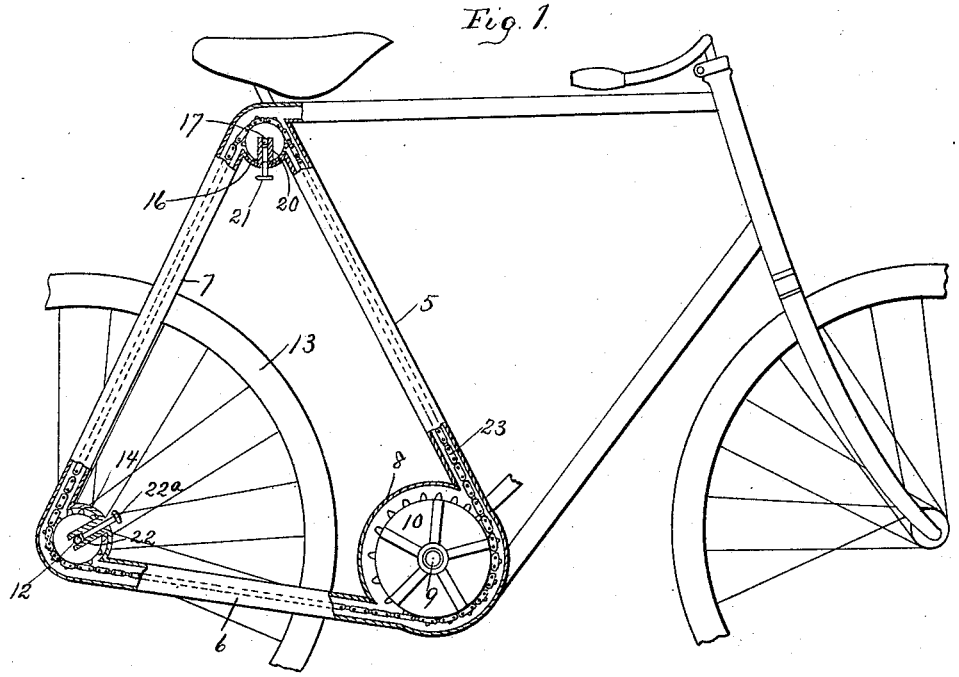
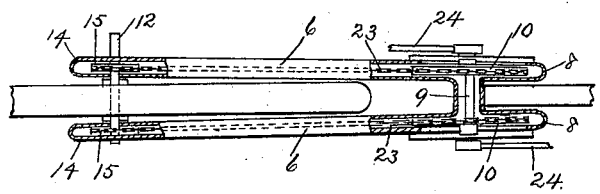
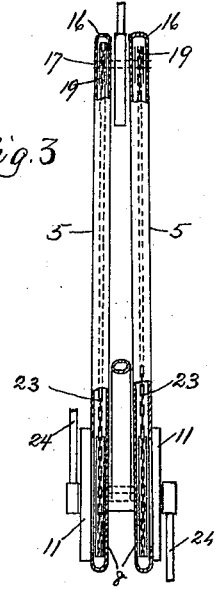
WITNESSES
INVENTOR
John A. Birchler
BY
ATTORNEYS.

United States Patent Office.

JOHN ANTON BIRCHLER, OF FORT NIOBRARA, NEBRASKA.

DRIVING MECHANISM FOR BICYCLES.

SPECIFICATION forming part of Letters Patent No. 617,873, dated January 17, 1899.

Application filed April 15, 1898. Serial No. 677,683. (No model.)

*To all whom it may concern:*

Be it known that I, JOHN ANTON BIRCHLER, a citizen of the United States, residing at Fort Niobrara, in the county of Cherry and State of Nebraska, have invented certain new and useful Improvements in Driving Mechanism for Bicycles, of which the following is a full and complete specification, such as will enable those skilled in the art to which it appertains to make and use the same.

This invention relates to driving mechanism for bicycles, and particularly to mechanism for this purpose employing endless chains; and the object of the invention is to provide a bicycle or similar vehicle with a pedal-shaft having two sprocket-wheels, one on each side, corresponding sprocket-wheels on the shaft of the drive-wheel, and a supplemental shaft supported over the drive-wheel and adapted to serve as a tension-shaft for the drive-chains, together with two drive-chains, all of said parts being entirely inclosed in casings, said casings forming part of the frame of the vehicle.

The invention is fully disclosed in the following specification, of which the accompanying drawings form a part, in which—

Figure 1 is a sectional side view of a part of a bicycle provided with my improved driving mechanism; Fig. 2, a sectional plan view of a part of said mechanism, and Fig. 3 is a sectional front view thereof.

In the drawings, forming part of this specification, the frame of my improved bicycle is provided with two tubular rods 5, which extend upwardly from the support of the pedal-shaft to the seat-support, and the rods 6, which extend from the support of the pedal-shaft to the support of the axle of the drive-wheel, are also tubular in form, and the rods 7, which extend from the support of the drive-wheel upwardly to the seat-support, are also tubular in form, and it will thus be seen that I provide two separate triangular tubular frames arranged side by side and which form the rear portion of the bicycle-frame. I also provide two circular casings 8, which form a part of these frames and through which the pedal-shaft 9 passes, and the pedal-shaft 9 is provided adjacent to each end with a sprocket-wheel 10, one of which is located in each of the circular casings 8. The outer sides of these circular casings 8 are open, and the opening thus formed is closed by a circular disk or plate 11, as clearly shown in Figs. 2 and 3, and these circular plates or disks 11 may be connected with said casings 8 in any desired manner. The shaft 12 of the drive-wheel 13 also passes through two circular casings 14, which are formed integral with or secured to said triangular frames in the same manner as the circular casings 8, and the shaft 12 of said drive-wheel is also provided with two sprocket-wheels 15, said sprocket-wheels 15 being located in said circular casings 14. The said triangular frames, composed of the rods 5, 6, and 9, are each provided at its apex, directly under the seat-support, with a circular casing 16, through which is passed a shaft 17, and said shaft 17 is also provided with two sprocket-wheels 19, said sprocket-wheels 19 being inclosed by the circular casings 16. The circular casings 16 are each provided with upwardly-directed supports 20, and the shaft 17 rests in the top of these supports, and passing vertically through each of said casings and through said supports is an adjusting-screw 21, by means of which said shaft 17 may be slightly raised or lowered when desired.

The casings 14, through which the shaft 12 of the drive-wheel passes, are also provided with radial supports 22, which are secured to or formed on the inner sides of said casings and which are in line with the center of the bicycle-frame, and passing through these supports are set-screws 22ª, by means of which the position of the said shaft 12 of the drive-wheel may be regulated.

Passing entirely around or through each of the triangular frames formed by the tubular rods 5, 6, and 7 and the corresponding circular casings 8, 14, and 16 and around the sprocket-wheels mounted in said casings is a drive-chain 23, and said drive-chains are entirely concealed or covered by said frames and said casings, as are also the sprocket-wheels around which said drive-chains pass.

The pedal-shaft 9 is provided with the usual pedal-cranks 24, and the operation will be readily understood from the foregoing description when taken in connection with the accompanying drawings and the following statement thereof.

The tension of the chains 23 may be increased whenever desired by means of the set-screws 21 and 22 or either set thereof, it being understood that the shaft of the drive-wheel is adjusted by the screws 22, while the shaft 17 may be raised or lowered by the screws 21.

In my improvement the sprocket-wheels and drive-chains are all fully inclosed, and it will thus be seen that no dust or dirt can come in contact therewith, and by this arrangement it will also be apparent that the said drive-chains and sprocket-wheels will not interfere with the clothing of the rider, and I thus accomplish the object of my invention by means of a simple and effective construction and one which does not add greatly to the cost of such vehicles as usually constructed.

Having fully described my invention, I claim as new and desire to secure by Letters Patent—

1. In a bicycle or similar vehicle provided with two triangular tubular supporting-frames, the apex of each of which is directly beneath the saddle-support, a pedal-shaft mounted in one of the lower pairs of corners of said frames, the shaft of the drive-wheel being passed through the other lower corners, and a supplemental shaft passing through the apices of said frames, said shafts being each provided with two sprocket-wheels and circular casings surrounding said sprocket-wheels and connecting with the adjoining sections of said frames, a drive-chain mounted in each of said frames and passing over and around said sprocket-wheel and through said circular casings, substantially as described.

2. A bicycle or similar vehicle provided with two triangular tubular supporting-frames, the apices of which are adapted to furnish devices for supporting a saddle, a pedal-shaft mounted in one of the lower pairs of corners of said frames, the shaft of the drive-wheel being passed through the other lower corners, and devices mounted interiorly of said tubular supporting-frames, and passing through the apices thereof, and adapted to operate in connection with the pedal-shaft, and said drive-wheel to operate the vehicle, substantially as shown and described.

In testimony that I claim the foregoing as my invention I have signed my name, in presence of the subscribing witnesses, this 7th day of April, 1898.

JOHN ANTON BIRCHLER.

Witnesses:
MILTON V. NICHOLSON,
GEHILE P. CRABB.